(12) United States Patent
Grant et al.

(10) Patent No.: US 7,978,484 B2
(45) Date of Patent: *Jul. 12, 2011

(54) FLYBACK CONSTANT VOLTAGE CONVERTER HAVING BOTH A PWFM MODE AND A PWM MODE

(75) Inventors: Matthew A. Grant, Palo Alto, CA (US); Zhibo Tao, San Jose, CA (US)

(73) Assignee: Active-Semi, Inc. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/803,513

(22) Filed: Jun. 28, 2010

(65) Prior Publication Data

US 2010/0271849 A1 Oct. 28, 2010

Related U.S. Application Data

(63) Continuation of application No. 12/152,035, filed on May 10, 2008, now Pat. No. 7,746,673.

(51) Int. Cl.
*H02M 3/335* (2006.01)
(52) U.S. Cl. .................. 363/21.18; 363/21.12
(58) Field of Classification Search ............ 363/20, 363/21.01, 21.12, 21.15, 21.17, 21.18
See application file for complete search history.

(56) References Cited

U.S. PATENT DOCUMENTS

| | | | | |
|---|---|---|---|---|
| 5,057,986 | A * | 10/1991 | Henze et al. | 363/20 |
| 7,531,970 | B2 * | 5/2009 | Yu et al. | 315/291 |
| 7,724,548 | B2 * | 5/2010 | Jones et al. | 363/37 |
| 7,746,673 | B2 * | 6/2010 | Grant et al. | 363/21.18 |
| 2009/0207636 | A1 * | 8/2009 | Huynh et al. | 363/21.12 |

* cited by examiner

*Primary Examiner* — Matthew V Nguyen
(74) *Attorney, Agent, or Firm* — Imperium Patent Works; T. Lester Wallace; Darien K. Wallace

(57) ABSTRACT

A flyback AC/DC switching converter has a constant voltage (CV) mode. The CV mode has sub-modes. In one sub-mode ("mid output power sub-mode"), the output voltage (VOUT) of the converter is regulated using both pulse width modulation and pulse frequency modulation. Both types of modulation are used simultaneously. In a second sub-mode ("low output power sub-mode"), VOUT is regulated using pulse width modulation, but the converter switching frequency is fixed at a first frequency. By setting the first frequency at a frequency above the frequency limit of human hearing, an undesirable audible transformer humming that might otherwise occur is avoided. In some embodiments, the converter has a third sub-mode ("high output power sub-mode"), in which pulse width modulation is used but the switching frequency is fixed at a second frequency. By proper setting of the second frequency, undesirable EMI radiation and other problems that might otherwise occur are avoided.

23 Claims, 8 Drawing Sheets

EMBODIMENT #1

EMBODIMENT #1

HIGHER VE IN MID OUTPUT POWER SUB-MODE
HIGHER SWITCHING FREQUENCY, BIGGER SW PULSE WIDTH

FIG. 10

LOWER VE IN MID OUTPUT POWER SUB-MODE
LOWER SWITCHING FREQUENCY, SMALLER SW PULSE WIDTH

EMBODIMENT #2

FLYBACK CONSTANT VOLTAGE CONVERTER HAVING BOTH A PWFM MODE AND A PWM MODE

CROSS REFERENCE TO RELATED APPLICATIONS

This application is a continuation of, and claims priority under 35 U.S.C. §120 from, nonprovisional U.S. patent application Ser. No. 12/152,035 entitled "Flyback Constant Voltage Converter Having Both a PWFM Mode and a PWM Mode," filed on May 10, 2008, now U.S. Pat. No. 7,746,673, the subject matter of which is incorporated herein by reference.

TECHNICAL FIELD

The present invention relates to flyback constant voltage (CV) switching converters.

BACKGROUND

Figure 1:
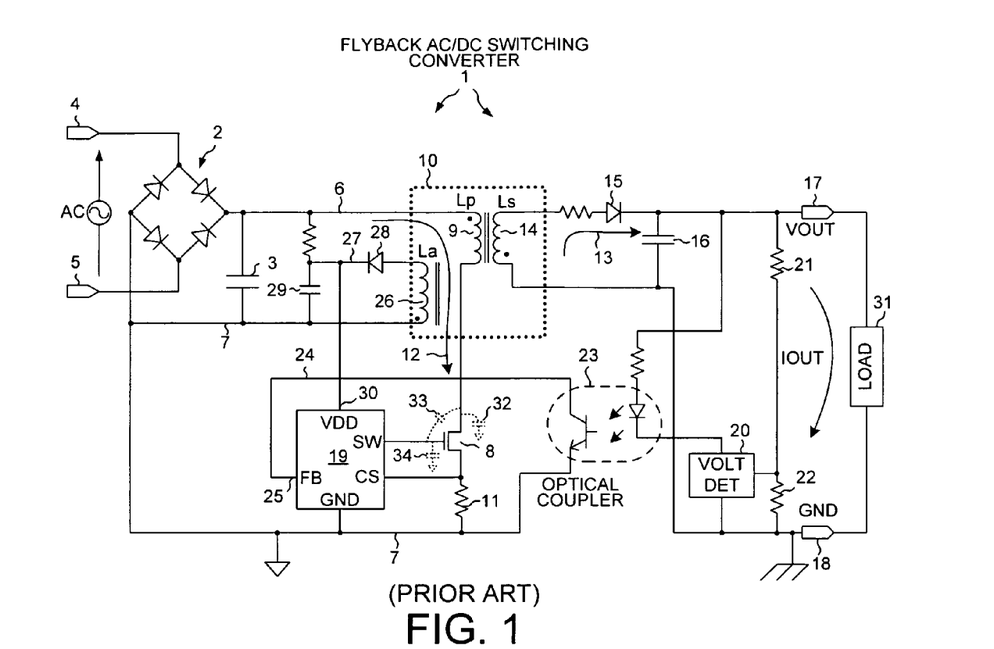
FIG. 1 (prior art) is a diagram of a flyback AC/DC switching converter.

FIG. 1 (Prior Art) is a diagram of an alternating current to direct current (AC/DC) flyback constant voltage (CV) switching converter 1. A four-diode full wave rectifier 2 and an associated capacitor 3 converts a 110-volt amplitude alternating current (AC) signal across input leads 4 and 5 into a rough direct current (DC) on node 6. Node 7 is a relative ground for the DC voltage on node 6. Converter 1 works by rapidly switching switch 8 to be conductive and non-conductive. When switch 8 is conductive, a primary current 12 is made to flow from DC node 6, through the primary winding 9 of transformer 10, through the conductive switch 8, through sense resistor 11, and to ground node 7. As the primary current 12 flows, energy builds in a magnetic field in the transformer. Switch 8 is then made to be non-conductive. The collapsing magnetic field in the transformer causes a pulse of current 13 to flow in the secondary winding 14 of the transformer. This pulse of secondary current is rectified by diode 15 and capacitor 16 into a DC output voltage VOUT. The output voltage VOUT is present between output terminals 17 and 18. A voltage detector 20 detects the output voltage through a resistive voltage divider involving resistors 21 and 22. A controller integrated circuit 19 monitors the magnitude of the DC output voltage via voltage detector 20, an optocoupler 23, a conductor 24, and feedback terminal 25. Transformer 10 also has a third winding 26. When the flow of current in the primary winding is stopped, the collapsing magnetic field also causes a pulse of current to flow in auxiliary winding 26. This current is converted into a DC voltage on node 27 by rectifier diode 28 and capacitor 29. The supply voltage from node 27 powers the controller integrated circuit 19 via supply voltage terminal 30. The voltage developed across sense resistor 11 during the flow of primary current 12 is detected and used as an indication of peak primary current. Controller integrated circuit 19 has a current limit circuit that limits peak primary current by terminating the current pulse through primary winding 9 when the voltage across sense resistor 11 during a pulse of the primary current exceeds a predetermined voltage. This limit in the peak primary current serves to limit the maximum output power of the converter 1. Block 31 represents a load on the converter 1. The output current IOUT is the current that converter 1 supplies the load 31.

Figure 2:
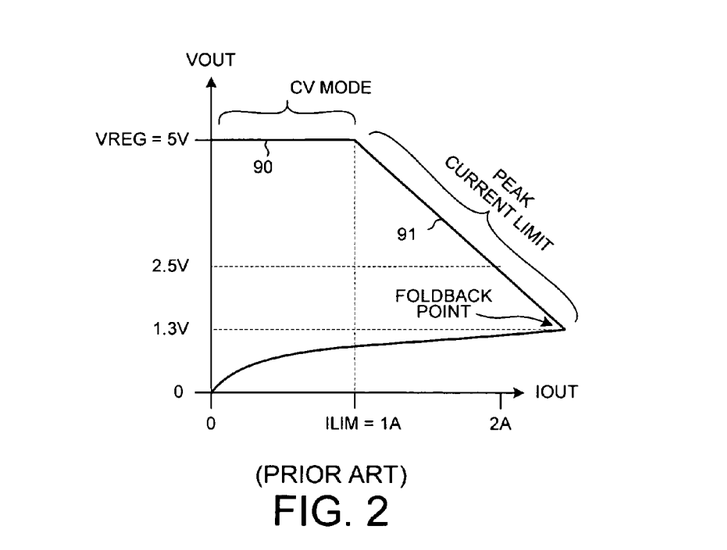
FIG. 2 (prior art) is diagram that illustrates the operation of the circuit of FIG. 1.

FIG. 2 (Prior Art) is diagram that illustrates the operation of the circuit of FIG. 1. In its CV mode, converter 1 attempts to maintain the output voltage VOUT across output leads 17 and 18 at a regulated output voltage VREG. VREG in this example is 5.0 volts. If, however, the load between output leads 17-18 is so great that the converter would have to supply pulses of primary current that have peak currents above the preset current limit value, then the output voltage VOUT is not sustained at the desired VREG and the output voltage VOUT drops. When controller 1 is operating in CV mode, converter operation is along line 90 of FIG. 2. When controller 1 is operating at the current limit, converter operation is along line 91 of FIG. 2.

Figure 3:
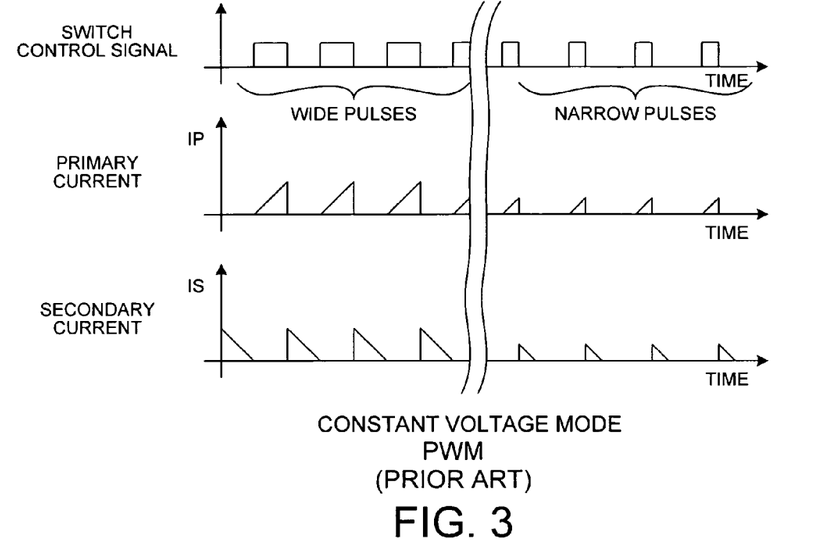
FIG. 3 (prior art) is a waveform diagram that illustrates using pulse width modulation (PWM) to regulate output voltage VOUT in the circuit of FIG. 1.

FIG. 3 is a simplified waveform diagram that illustrates a first way that controller integrated circuit 1 might control switch 8 to regulate the voltage VOUT to VREG in the CV mode. This technique is referred to as "pulse width modulation". If less energy should be transferred per unit time to load 31 into order to maintain the voltage VOUT at the regulated VREG value, then integrated circuit 19 narrows the pulses of the control signal supplied to switch 8. The left side of FIG. 3 illustrates the switch control signal with relatively wide pulses. The current in primary winding 9 during an on-time of the switch is allowed to rise to a higher peak current value, and this high peak value results in a corresponding higher pulse of secondary current when the switch is turned off.

The right side of FIG. 3 illustrates the switch control signal with relatively narrow pulses. The current in primary winding 9 during each on-time of switch 8 is not allowed to rise to as high of a peak current value as in the wide pulse situation. Accordingly, the current pulses induced into secondary winding 14 are of lower magnitude as well. The controller integrated circuit 19 regulates the pulse width to maintain VOUT at the desired VREG.

Figure 4:
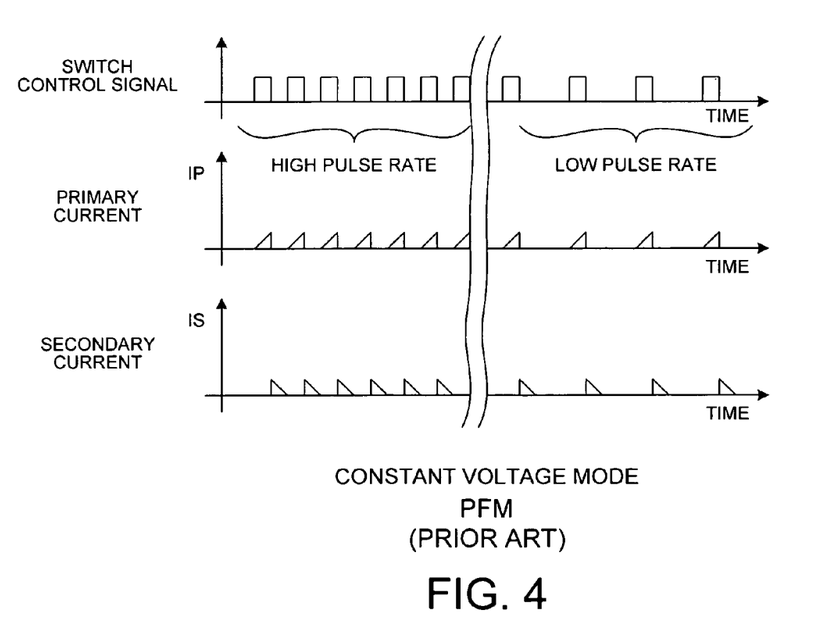
FIG. 4 (prior art) is a waveform diagram that illustrates using pulse frequency modulation (PFM) to regulate output voltage VOUT in the circuit of FIG. 1.

FIG. 4 is a simplified waveform diagram that illustrates a second way that controller integrated circuit 19 might control switch 8 to regulate the voltage VOUT to VREG in the CV mode. This technique is referred to as "pulse frequency modulation". If less energy should be transferred per unit time to the load 31 to maintain the voltage VOUT at the regulated VREG value, then integrated circuit 19 decreases the number of pulses per unit time supplied to switch 8. All the pulses are of the same width, so the magnitudes of the peak primary current during each switch on-time are the same, and the magnitudes of the induced pulses of secondary current are also the same. The number of such pulses per unit time, however, is varied to control the amount of energy supplied to load 31 per unit time such that VOUT is regulated to the desired VREG. The left side of FIG. 4 illustrates the switch control signal with a high frequency of pulses. The right side of FIG. 3 illustrates the switch control signal with a low frequency of pulses.

The pulse width modulation and pulse frequency modulation schemes have different advantages and disadvantages. There are parasitic capacitances represented in FIG. 1. Capacitor symbols 32-34 represent some of these capacitances. Each time switch 8 is turned on or turned off, these capacitances must either be charged or discharged. This charging and discharging represents a waste of energy. A way to reduce this wasted energy is desired.

SUMMARY

A flyback AC/DC switching converter has a constant voltage (CV) mode. A controller integrated circuit of the converter generates and supplies a control signal to a switch. The pulse control signal causes the switch to turn on and turn off such that pulses of a primary current flow through a primary winding of a transformer. When the primary current of each pulse stops, a corresponding pulse of current is made to flow through a secondary winding of the transformer. These pulses of secondary current transfer energy to the output of the converter. By proper control of the pulse width and/or pulse frequency of the pulses, the controller integrated circuit causes the output voltage VOUT of the converter to be regulated at a desired VREG voltage.

In one novel aspect, the flyback converter has a "mid output power sub-mode" of the CV mode. In this sub-mode, both pulse width modulation as well as pulse frequency modulation are used simultaneously to regulate the output voltage VOUT at VREG.

In addition to the "mid output power sub-mode", the flyback converter also has a "low output power sub-mode" of the CV mode. In this sub-mode, pulse width modulation is used to regulate the output voltage at VREG, but the switching frequency of the converter is fixed at a first frequency. To accommodate smaller and smaller amounts of energy to be transferred to the load per unit time, the pulse width of the pulses is narrowed but the frequency of the pulses remains fixed. In one example, the fixed switching frequency is a frequency just above the upper limit of the human auditory range (for example, 20 kHz). By preventing the switching frequency from going below 20 kHz, an undesirable audible humming of the transformer that might otherwise occur is avoided.

In some embodiments, the flyback converter also has a "high output power sub-mode" of the CV mode. In this sub-mode, pulse width modulation is used to regulate the output voltage at VREG, but the switching frequency of the converter is fixed at a second frequency. To accommodate larger and larger amounts of energy to be transferred to the load per unit time, the pulse width of the pulses is widened. In one example, the second frequency is a frequency of about 40 kHz. By preventing the switching frequency from going above this second frequency (for example, 40 kHz), undesirable EMI radiation problems and/or EMI injection problems that might otherwise occur are avoided.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 5:
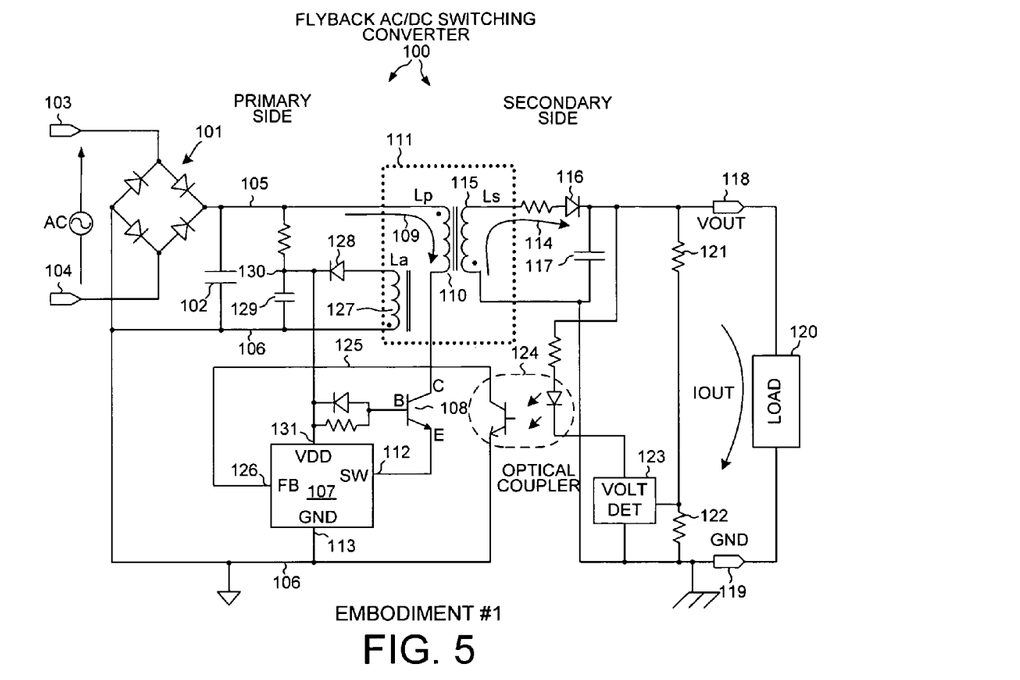
FIG. 5 is a diagram of a first embodiment of a flyback AC/DC switching converter in accordance with one novel aspect.

FIG. 5 is a diagram of a first embodiment of a flyback alternating current to direct current (AC/DC) constant voltage (CV) switching converter 100 in accordance with one novel aspect. Flyback converter 100 includes a four-diode full wave rectifier 101 and a capacitor 102 that together form a DC power supply that converts an alternating current (AC) voltage present between input terminals 103 and 104 into a rough direct current (DC) voltage on node 105. Node 106 is the relative DC ground node. The AC voltage across terminals 103 and 104 may, for example, be 110 volts AC.

A novel flyback switching converter controller integrated circuit 107 (described in further detail below) controls a switch 108 so that switch 108 conducts pulses of current 109 through a primary winding 110 of a transformer 111. The pulses of current 109 flow from node 105, through primary 110, through the switch 108, into the switch terminal 112 of controller integrated circuit 107, and through integrated circuit 107 to ground terminal 113, to ground node 106. When the current 109 of one of these pulses flows, energy builds in a magnetic field in transformer 111.

Figure 6:
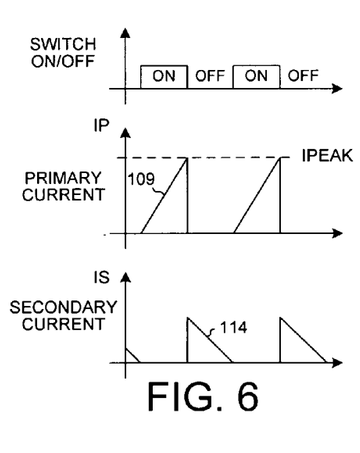
FIG. 6 is a simplified waveform diagram that illustrates waveforms of signals in the converter of FIG. 5.

FIG. 6 is a simplified waveform diagram. The leftmost pulse in the upper waveform labeled "SWITCH ON/OFF" indicates when switch 108 is made to be conductive (i.e., is turned "on"). The rising triangular waveform of the resulting primary current IP is illustrated in the second waveform labeled "PRIMARY CURRENT". Controller integrated circuit 107 then causes the pulse of the SWITCH ON/OFF signal to transition low, thereby making switch 108 non-conductive. Primary current 109 stops flowing through the primary. The primary current waveform therefore has a triangular shape as illustrated. The collapsing electric field in transformer 111 causes a corresponding current 114 to flow through secondary 115. The pulse of secondary current 114 is represented in FIG. 6 by the falling triangular waveform labeled "SECONDARY CURRENT". The shapes of the currents in FIG. 6 are idealized, and are presented here for explanatory purposes.

The pulse of secondary current 114 is rectified by diode 116 and storage capacitor 117. By turning switch 108 on and off repeatedly, pulses of secondary current are made to flow through diode 116 such that the voltage on capacitor 117 is maintained at a desired voltage VREG during a constant voltage (CV) mode of the flyback converter 100. The output voltage VOUT is present between output terminals 118 and 119. Block 120 represents a load on converter 100. Current IOUT is the current that converter 100 supplies to load 120. Controller integrated circuit 107 monitors VOUT via a voltage divider involving resistors 121 and 122, a voltage detector 123, an optical coupler 124, a conductor 125 and feedback terminal 126.

Transformer 110 also includes a third winding 127. Third winding 127 is sometimes referred to as the auxiliary winding. A rectifier involving a diode 128 and a capacitor 129 generates a rough DC voltage on node 130, and this rough DC voltage is supplied to the supply voltage terminal (VDD) 131 of controller integrated circuit 107. The voltage on node 130 is used to power controller integrated circuit 107.

Figure 7:
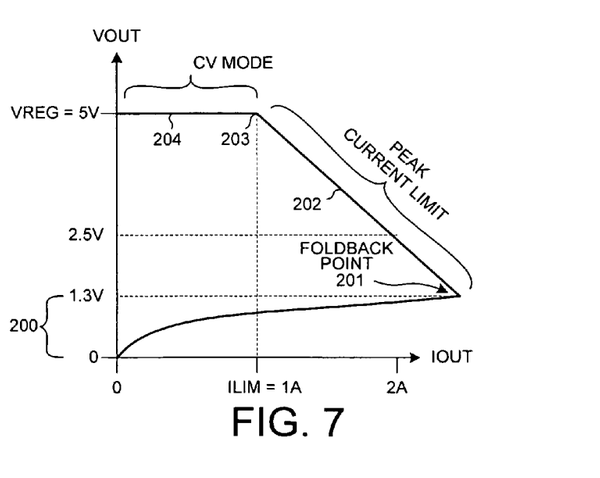
FIG. 7 is a diagram that illustrates a constant voltage (CV) and peak current limit operation of the converter of FIG. 5.

FIG. 7 is a chart that illustrates an operational characteristic of the flyback converter 100 of FIG. 5 as load 120 increases. Initially, flyback converter 100 is operating in constant voltage mode and is regulating VOUT to be the desired VREG value of 5.0 volts. This is a relatively low output current IOUT condition. As the load increases, operation as indicated in FIG. 7 moves along line 204 from left to right as IOUT increases. The current IOUT supplied to the load increases until point 203 is reached. At this point, the pulse width of primary current pulses as well as the frequency of primary current pulses are fixed, and the maximum amount of primary current in a pulse of primary current is also limited. Accordingly, as the load 120 continues to increase further, the output voltage VOUT of the converter begins to fall. As load 120 increases further, operation as indicated in FIG. 7 moves down along line 202. This operation is referred to as "PEAK CURRENT LIMIT" operation. When the load is so great that VOUT is so low in this high output power condition at foldback point 201, controller integrated circuit 107 stops operating for safety and circuit protection reasons. The switching of switch 108 is halted, and IOUT falls quickly until VOUT reaches zero volts. This condition of operation is indicated in FIG. 7 by reference numeral 200.

Current limit operation along line 202 is not referred to here as a constant current (CC) mode because the current changes to too much of a degree with respect to VOUT as illustrated. The term "constant current", as that term is used in this patent document with respect to a constant current (CC) mode and a constant voltage (CV) mode means that the IOUT changes less than approximately twenty percent in the "constant current" mode as VOUT changes. Note that in FIG. 7, the output current IOUT changes by more than one hundred percent as VOUT increases from about 1.3 volts to the VREG value of 5.0 volts.

Figure 8:
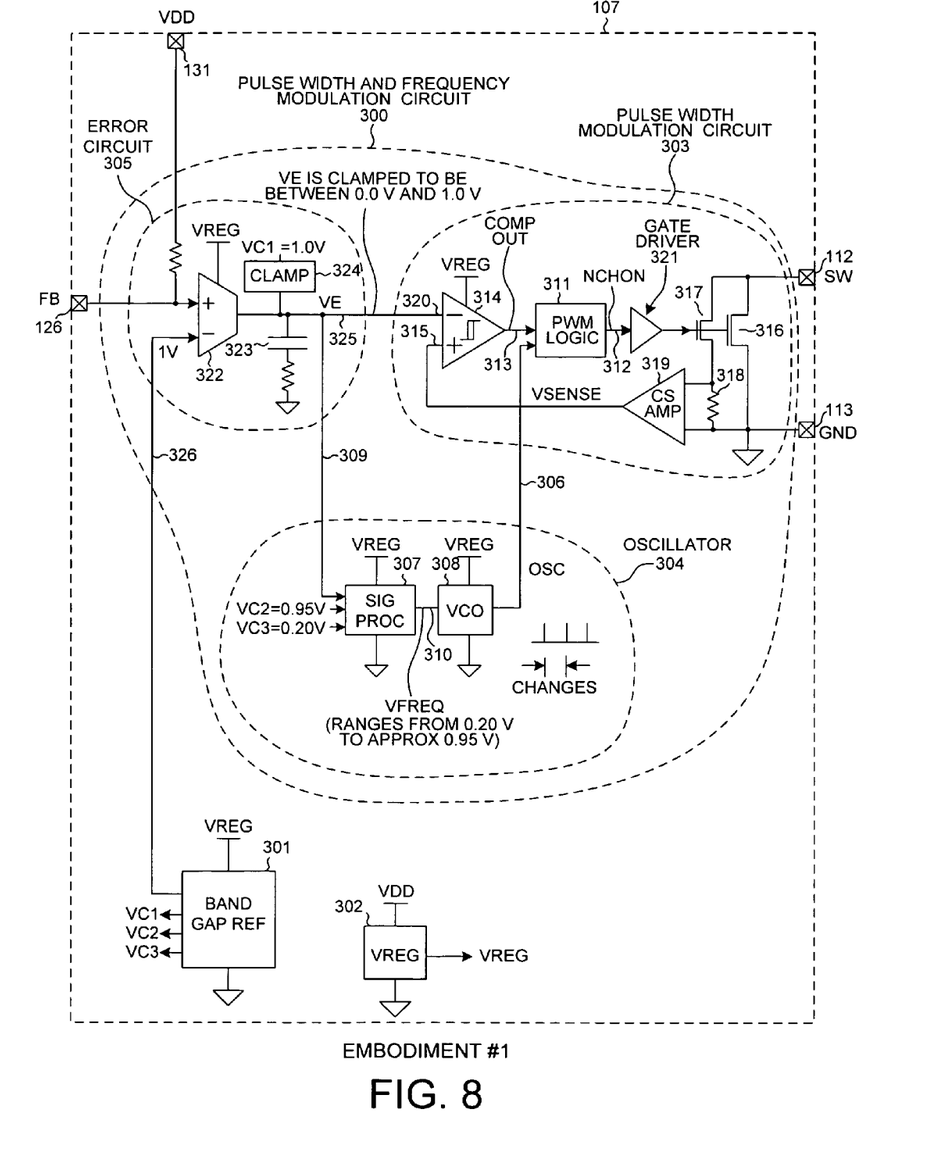
FIG. 8 is a more detailed diagram of the controller integrated circuit 107 of the converter of FIG. 5.

FIG. 8 is a more detailed diagram of the controller integrated circuit 107 of FIG. 5. Controller integrated circuit 107 includes feedback terminal 126, switch terminal 112, supply voltage terminal 131, ground terminal 113, pulse width and frequency modulation (PWFM) circuit 300, a bandgap reference circuit 301 and a voltage regulator circuit 302. PWFM circuit 300 in turn includes a pulse width modulation circuit 303, an oscillator 304, and an error circuit 305.

Oscillator 304 generates a clock signal OSC and supplies this clock signal via conductor 306 to pulse width modulation circuit 303. Clock signal OSC in the present example is a train of digital pulses. The frequency FOSC of clock signal OSC has a lower limit of 20 kilohertz, and can range up to an upper limit of 40 kilohertz. Oscillator 304 includes a signal processing circuit 307 and a voltage controlled oscillator (VCO) 308. Signal processing circuit receives an error voltage VE via conductor 309 and outputs a clamped version of VE onto conductor 310 as voltage signal VFREQ. If VE is greater than 0.95 volts, then signal processing circuit 307 outputs a VFREQ voltage of 0.95 volts. If VE is lower than 0.20 volts, then signal processing circuit 307 outputs a VFREQ voltage of 0.20 volts. If VE is a voltage between 0.20 volts and 0.95 volts, then signal processing circuit 307 passes the VE voltage through such that the VE voltage value is passed onto the voltage control input of VCO 307. VCO 307 generates clock signal OSC such that if VFREQ is 0.95 volts then the frequency of the clock signal OSC is 40 kilohertz, whereas if VFREQ is 0.20 volts then the frequency of the clock signal OSC is 20 kilohertz. Accordingly, for VE values in the range of from 0.0 volts to 0.20 volts, the frequency FOSC of clock signal OSC is 20 kilohertz. For VE Values in the range of from 0.95 volts to 1.00 volts, the frequency FOSC of clock signal OSC is 40 kilohertz. For VE values in the range of from 0.20 volts to 0.95 volts, increasing VE causes a corresponding increase in the frequency FOSC of clock signal OSC. Similarly, decreasing VE causes a corresponding decrease in the frequency FOSC of clock signal OSC.

Pulse width modulation circuit 303 includes pulse width modulation (PWM) logic 311. PWM logic 311 receives the clock signal OSC via conductor 306, and on a rising edge of the clock signal OSC starts a high pulse of a signal NCHON on conductor 312. The amount of time that the high pulse of the signal NCHON is high is determined by the time when the digital signal COMP OUT received on conductor 313 transitions high.

The bulk of the current of the switch signal flows through NFET 316, but a small fractional proportion of the current flows through NFET 317. This proportionally smaller current flows across sense resistor 318 and is converted into a voltage. Current sense amplifier 319 converts this sense voltage into the signal VSENSE that is supplied onto the non-inverting input lead 315 of comparator 314. Accordingly, during the on-time of switch 108, the VSENSE signal increases along with an increase in primary current. When this rising VSENSE voltage exceeds a voltage on the non-inverting input lead 320 of comparator 314, the signal output by comparator 314 transitions from low to high. This rising edge causes PWM logic 311 to terminate the pulse of the signal SW.

Accordingly, the signal SW is made to transition high on the rising edge of the clock signal OSC, and is made to transition low some time later when VSENSE exceeds the voltage VE. The duration of the high pulse of the signal SW is extended by increasing VE because if VE is increased, then it will take longer for the rising voltage VSENSE to reach VE. Similarly, the duration of the high pulse of the signal SW is shortened by decreasing VE because if VE is decreased, then it will not take as long for the rising voltage VSENSE to reach VE. The signal NCHON output by PWM logic 311 passes through a gate driver 321 and onto the gates of N-channel field effect transistors 317 and 316.

Error circuit 305 receives the feedback signal from feedback terminal 126 and generates the error voltage VE. If the voltage on the non-inverting input lead of a transconductance amplifier 322 is greater than a 1.0 volt reference voltage on its non-inverting input lead, then transconductance amplifier 322 sources current to capacitor 323 and the voltage on integrating capacitor 323 is made to rise. Conversely, if the voltage on the non-inverting input lead of transconductance amplifier 322 is smaller than the 1.0 volt reference voltage on its non-inverting input lead, then transconductance amplifier 322 sinks current from integrating capacitor 323 and the voltage on capacitor 323 is made to decrease. The values of resistors 121, 122 (see FIG. 5), the voltage detector 123 and the optical coupler 124 are selected such that when VOUT across terminals 118 and 119 is its desired VREG value of 5.0 volts, then the voltage on terminal FB 126 is at 1.0 volt. Clamping circuit 324 clamps the voltage VE on node 325 such that VE cannot exceed 1.0 volt. Due to the connection of capacitor 323, VE does not fall below ground potential.

When operating in CV mode at point 203 in the chart of FIG. 7, the peak primary current per pulse is at its maximum, current-limited, value. The pulse width of the primary current pulses is fixed, as is the pulse frequency of the primary current pulses. The total output power of the converter is therefore fixed. Output power is the product of VOUT and IOUT. So if the load is increased further and IOUT is made to increase, then the output voltage VOUT must decrease. This decrease in VOUT during the current limit condition is indicated by line 202 in FIG. 7.

Figure 9:
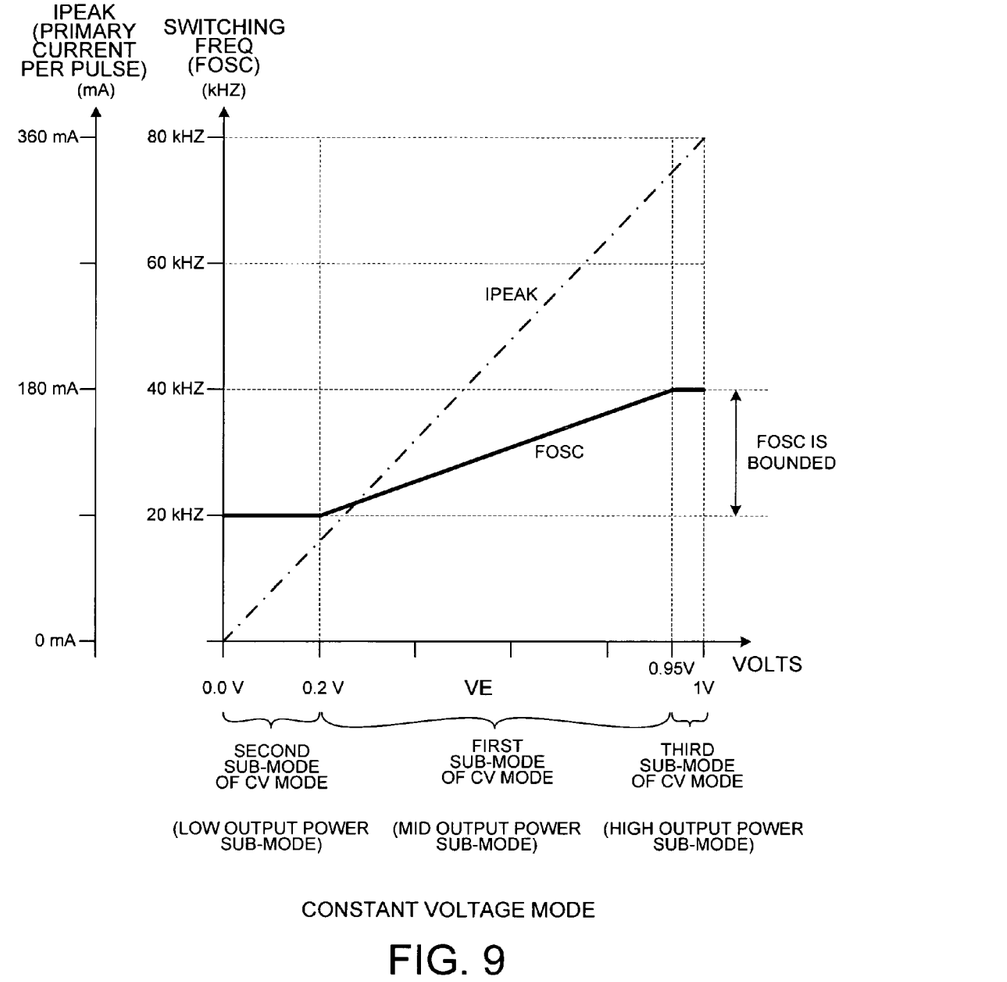
FIG. 9 is a diagram that illustrates the three sub-modes of the constant voltage (CV) mode: 1) a "mid output power sub-mode", 2) a "low output power sub-mode", and 3) a "high output power sub-mode".

FIG. 9 is a chart that illustrates constant voltage mode operation of the controller integrated circuit 107 of FIG. 8. Controller integrated circuit 107 has three sub-modes of the constant voltage mode: 1) a "mid output power sub-mode" in which the switching signal SW is both pulse width modulated and pulse frequency modulated, 2) a "low output power sub-mode" in which the switching signal SW is pulse width modulated but in which the pulse frequency is fixed at a first frequency (20 kilohertz in this example), and 3) a "high output power sub-mode" in which the switching signal SW is pulse width modulated but in which the pulse frequency is fixed at a second frequency (40 kilohertz in this example).

If converter 100 is operating in the low output power sub-mode and if still less energy per unit time is to be supplied to the load 120 to maintain VOUT in voltage regulation, then the pulse width of each primary current pulse is decreased but the number of primary current pulses per unit time remains constant at twenty thousand a second. In this situation, VE is below 0.20 volts (between ground potential and 0.20 volts). Signal processing circuit 307 clamps VFREQ to 0.20 volts and therefore fixes the frequency of the oscillating signal at 20 kHz. The value of VE is, however, applied to comparator 314 and reduces the pulse width of the signal SW.

If converter 100 is operating in the high output power sub-mode and if still more energy per unit time is to be supplied to the load to maintain VOUT in voltage regulation, then the pulse width of each primary current pulse is increased but the number of primary current pulses per unit time remains constant at forty thousand a second. In this situation VE is above 0.95 volts (between 0.95 volts and 1.0 volts). Signal processing circuit 307 clamps VFREQ to 0.95 volts and therefore fixes the frequency of the oscillating signal at 40 kHz. The value of VE is, however, applied to comparator 314 and increases the pulse width of the signal SW.

If converter 100 is operating in the mid output power sub-mode, and if a different amount of energy per unit time is to be supplied to the load to maintain VOUT in voltage regulation, then the pulse width of each primary current pulse is changed and the number of primary current pulses per unit time is also changed. In this situation, VE is between 0.20 volts and 0.95 volts. Signal processing circuit 307 is not performing clamping, so changes in VE pass through signal processing circuit 307, and are supplied to VCO 308 as signal VFREQ. Thus, in the mid output power sub-mode, both pulse width modulation and pulse frequency modulation are used to control switch 108 in the constant voltage mode.

Figure 10:
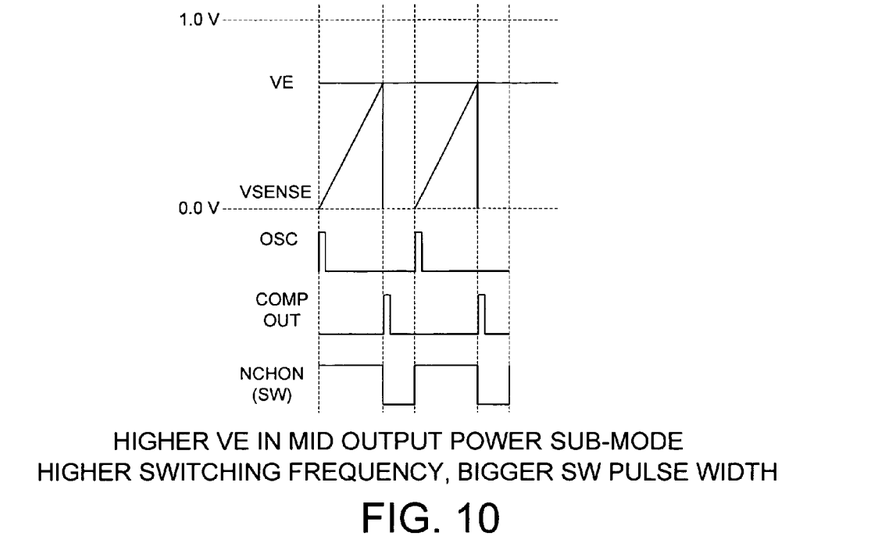
FIGS. 10 and 11 are waveform diagrams that illustrate operation in the "mid output power sub-mode" in which both pulse width modulation and pulse frequency modulation are performed simultaneously.
Figure 11:
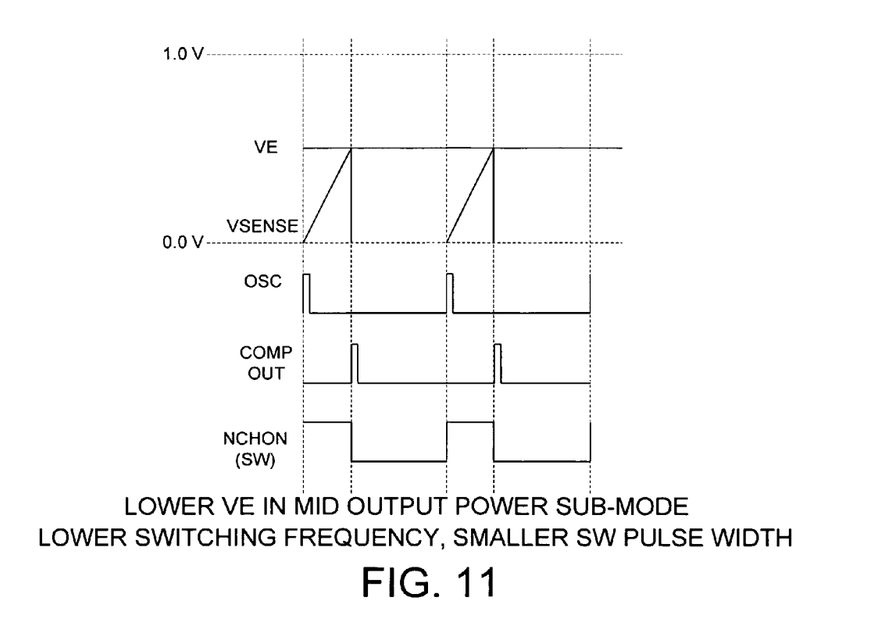

FIGS. 10 and 11 illustrate how operation in the "mid output power sub-mode" involves both pulse width modulation and pulse frequency modulation. FIG. 10 illustrates that if VE is relatively high, then the pulses of NCHON are relatively long, and the time duration between consecutive pulses is relatively short, so more energy per unit time is delivered to the load. FIG. 11 illustrates that if VE is relatively low, then the pulses of NCHON are relatively short, and the time duration between consecutive pulses is relatively long, so less energy per unit time is delivered to the load.

In one novel aspect, controller integrated circuit 107 increases energy efficiency. It is recognized that energy is lost during the charging and discharging of capacitances such as the capacitances 32-34 of the prior art converter of FIG. 1. In the novel circuit of FIG. 5, the amount of this energy that is wasted is reduced by reducing the amount of switching that occurs. Rather than just using pulse width modulation to reduce the amount of energy supplied to the output during constant voltage mode, the number of pulses per unit time is also reduced to reduce the number of times per unit time the parasitic capacitances must be charged and discharged. In one novel aspect, it is recognized that the transformer may generate an audible humming sound if the switching frequency of signal SW falls low enough to be in the human hearing frequency range. The low output power sub-mode is therefore provided such that the minimum switching frequency of signal SW is high enough that a user will not be able to hear the transformer humming. In the example of FIG. 5, the minimum switching frequency is set at 20 kHz.

In another novel aspect, it is recognized that if a converter is switched at high frequencies, undesirable electromagnetic interference (EMI) radiation may be generated. Undesirably large amounts of electromagnetic energy may begin to radiate from the converter. Electromagnetic energy may also be injected through the power cord back into the wall socket into which the power cord of the converter is plugged. Electromagnetic energy may also be transferred into equipment that receives the output voltage VOUT. The high output power sub-mode is therefore provided such that the maximum switching frequency is low enough that the amount of such undesirable EMI energy is kept to within acceptable levels. In the example of FIG. 5, the maximum switching frequency is set at 40 kHz.

Figure 12:
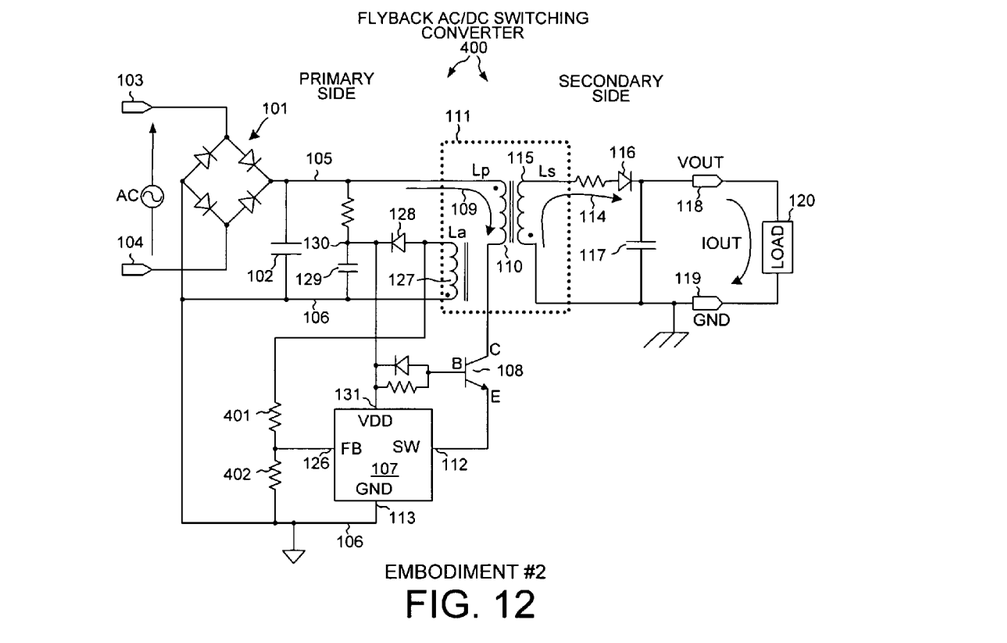
FIG. 12 is a diagram of a second embodiment of a flyback AC/DC switching converter in accordance with second novel aspect.

FIG. 12 is a diagram of a second embodiment of a flyback alternating current to direct current (AC/DC) constant voltage (CV) switching converter 400 in accordance with one novel aspect. The flyback converter 400 of FIG. 12 includes many of the same components as the flyback converter 100 of FIG. 5, and in this example advantageously has only four terminals. The same reference numerals in FIGS. 12 and 5 identify the same or corresponding components. Flyback converter 400 of FIG. 12, however, differs from flyback converter 100 of FIG. 5 in that it does not use an optocoupler, but rather senses the voltage on third winding 127 using a voltage divider. The voltage divider includes resistors 401 and 402. The divided down voltage is sensed at feedback terminal 126. Controller integrated circuit 107 is therefore referred to as a "primary side controller". Converter 400 of FIG. 12 also differs from converter 100 of FIG. 5 in that it has a constant current (CC) mode rather than a simple peak current limit mode.

Figure 13:
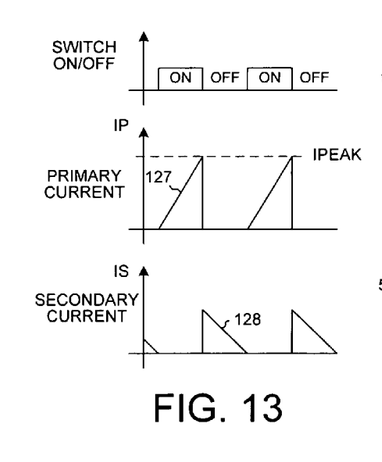
FIG. 13 is a simplified waveform diagram that illustrates waveforms of signals in the converter of FIG. 12.

FIG. 13 is a simplified waveform diagram that illustrates how a pulse of primary current 109 results in a corresponding pulse of secondary current 114. This operation is the same as the operation of FIG. 5 described above in connection with FIG. 6 above.

Figure 14:
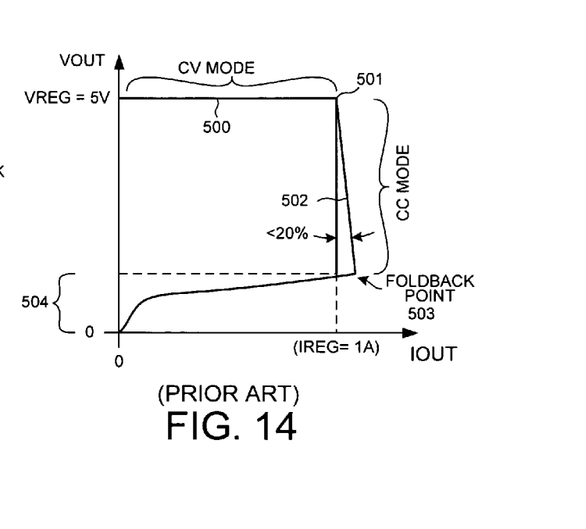
FIG. 14 is a diagram that illustrates a constant voltage (CV) and constant current (CC) operation of the circuit of FIG. 12.

FIG. 14 is a chart that illustrates an operational characteristic of converter 400 of FIG. 12 as load 120 increases. Initially, converter 400 operates in its constant voltage (CV) mode and is regulating VOUT across terminals 118 and 119 to be the desired VREG value of 5.0 volts. As the load 120 increases, operation in the CV mode passes through the three sub-modes from the "low output power sub-mode", to the "mid output power sub-mode", to the "high output power sub-mode". As the load increases, operation as indicated in FIG. 7 moves along line 500 from left to right. The current IOUT supplied to the load increases until point 501 is reached. At this point, the pulse width of pulses is fixed, and the peak primary current in a pulse of primary current is also fixed. As load 120 continues to increase further, the output current IOUT is regulated to be the desired IREG value. If the switching frequency were fixed, and if the pulse width were fixed, and if the peak primary current during a current pulse did not change, then if the load were to increase the output current IOUT would change as illustrated in FIG. 7. In the case of the second embodiment of FIG. 12, however, as load 120 increases the switching frequency is reduced to maintain constant regulation of output current IOUT at IREG. Operation as indicated in FIG. 14 moves down along line 502. In the CC mode, IOUT varies by less than twenty percent. When VOUT is adequately low due to the load being high at foldback point 503, controller integrated circuit 107 stops operating for safety and circuit protection reasons. The switching of switch 108 is therefore halted, and IOUT and VOUT fall quickly to zero. This low VOUT operation is indicated in FIG. 7 by reference numeral 504.

Figure 15:
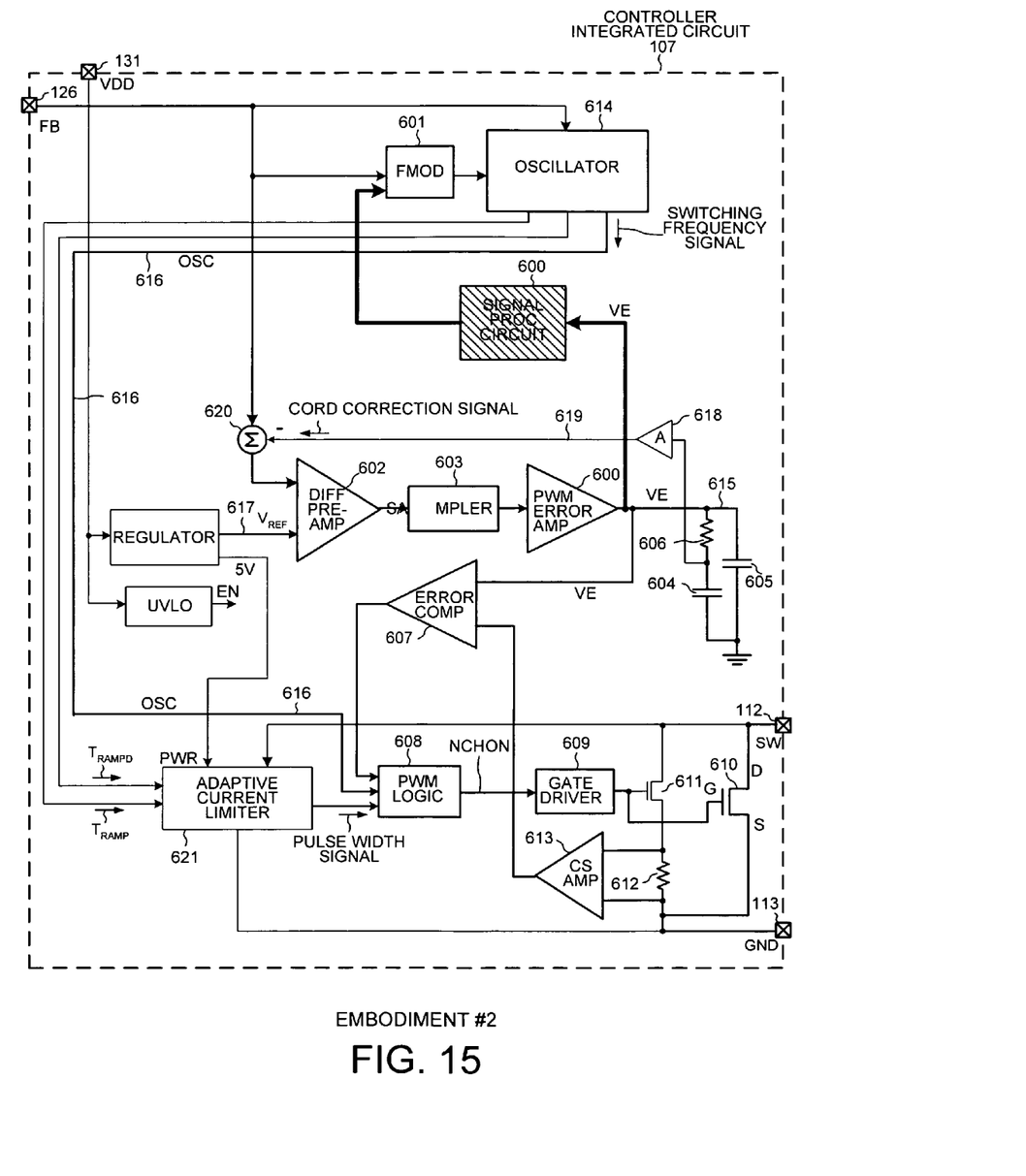
FIG. 15 is a more detailed diagram of the controller integrated circuit 107 of the converter of FIG. 12.

FIG. 15 is a more detailed diagram of controller integrated circuit 107 of the second embodiment of FIG. 12. For a detailed description of the operation of this controller integrated circuit 107, see: U.S. patent application Ser. No. 11/789,160, filed Apr. 23, 2007, by Huynh et al. (the entire subject matter of which is incorporated herein by reference). The novel controller integrated circuit 107 of FIG. 12 differs from the controller integrated circuit described in application Ser. No. 11/789,160 in that the circuit of FIG. 15 includes signal processing circuit 600 and its connections to error amplifier 600 and the frequency modulation block 601. Signal processing circuit 600 receives VE from node 615 and outputs a clamped version of VE to FMOD block 601 in the same way that signal processing circuit 307 of FIG. 8 receives VE from node 325 (conductor 309) and outputs a clamped version of VE to VCO 308.

Circuits 600, 602, 603 and capacitors 604 and 605 and resistor 606 in FIG. 15 correspond to the error circuit 305 of FIG. 8. Error comparator 607 of FIG. 15 corresponds to comparator 314 of FIG. 8. PWM logic block 608 of FIG. 15 corresponds to PWM logic block 311 of FIG. 8. Gate driver 609 of FIG. 15 corresponds to gate driver 321 of FIG. 8. Transistors 610 and 611 of FIG. 15 correspond to transistors 316 and 317 of FIG. 8, respectively. Current sense resistor 612 and current sense amplifier 613 of FIG. 15 correspond to current sense resistor 318 and amplifier 319 of FIG. 8, respectively. Signal processing circuit 600 of FIG. 15 corresponds to signal processing circuit 307 of FIG. 8. Blocks 601 and 614 of FIG. 15 correspond to VCO block 308 of FIG. 8.

In constant current (CC) mode, FMOD block 601 causes oscillator 614 to change the switching frequency as the detected voltage on the FB terminal 126 changes. For example, as VOUT decreases as indicated along line 502 in FIG. 14, the switching frequency is reduced such that IOUT remains substantially constant.

VE node 615 of FIG. 15 corresponds to VE node 325 of FIG. 8. Conductor 616 of FIG. 15 corresponds to conductor 306 of FIG. 8. Conductor 617 in FIG. 15 corresponds to conductor 326 in FIG. 8. The cord correction circuitry 618-620 (cord resistance compensation circuitry) and the adaptive current limiter 621 of FIG. 15 operate to regulate IOUT during the CC mode such that the IOUT characteristic does not extend outward in current limit as illustrated in FIG. 7 but rather such that the IOUT characteristic is substantially vertical in the constant current mode as illustrated in FIG. 14.

In CC mode, the peak primary current during switching cycle is to remain constant and fixed. This is sometimes difficult to achieve. Changes in propagation delay through circuit components, changes in AC line voltage, temperature changes, and component variations may cause the primary current peak current to vary if ordinary constant current mode circuitry is employed. Adaptive current limiter 621 accounts for these conditions that otherwise would affect the peak primary current such that a substantially fixed peak primary current is maintained during CC mode. For additional details on the operation of cord correction circuitry 618-620 and adaptive current limiter 621 and similar circuits, see: 1) U.S. patent application Ser. No. 11/789,160, filed Apr. 23, 2007, by Huynh et al.; and 2) U.S. patent application Ser. No. 12/079,039, filed Mar. 24, 2008, by Kunst et al. (all the entire subject matter of both of the above-listed two patent applications is incorporated herein by reference).

Although the invention is described above in connection with certain exemplary embodiments, the invention is not limited to the exemplary embodiments. Accordingly, various modifications, adaptations, and combinations of various features of the described embodiments can be practiced without departing from the scope of the invention as set forth in the claims.

What is claimed is:

1. A flyback switching converter controller integrated circuit comprising:
 a feedback terminal, wherein a feedback signal that is indicative of an output voltage is present on the feedback terminal;
 a switch terminal; and
 a pulse width and frequency modulation (PWFM) circuit that receives the feedback signal in a constant voltage (CV) mode and based on the feedback signal supplies a stream of control signal pulses onto the switch terminal, wherein each pulse has a pulse width and wherein the pulses of the stream occur at a pulse frequency, wherein in a lower output power sub-mode of the CV mode the PWFM circuit modulates the pulse width of the pulses but the pulse frequency is fixed at a first frequency, wherein in a higher output power sub-mode of the CV mode the PWFM circuit modulates the pulse frequency of the stream, and wherein a human auditory range has an upper limit, and wherein the first frequency is just above the upper limit of the human auditory range.

2. The flyback switching converter controller integrated circuit of claim 1, wherein the control signal pulses are pulses of current conducted through the switch terminal.

3. The flyback switching converter controller integrated circuit of claim 2, wherein the control signal pulses are voltage pulses present on the switch terminal.

4. The flyback switching converter controller integrated circuit of claim 1, wherein the PWFM circuit comprises:
 an error circuit that receives the feedback signal and generates an error signal;
 an oscillator that receives the error signal and outputs a periodic signal, wherein in the higher output power sub-mode a frequency of the periodic signal is increased if the error signal increases in magnitude, wherein in the lower output power sub-mode the frequency of the periodic signal is fixed at the first frequency; and
 a pulse width modulating circuit that receives the error signal and the periodic signal and generates therefrom the stream of control signal pulses.

5. The flyback switching converter controller integrated circuit of claim 1, wherein there is also a highest output power sub-mode of the CV mode, wherein in the highest output power sub-mode the PWFM circuit modulates the pulse width of the pulses but the pulse frequency is fixed at a second frequency, wherein the second frequency is higher than the first frequency.

6. The flyback switching converter controller integrated circuit of claim 5, wherein the first frequency is less than thirty kilohertz and wherein the second frequency is higher than thirty kilohertz.

7. A flyback switching converter controller integrated circuit comprising:
 a feedback terminal;
 a switch terminal; and
 a pulse width and frequency modulation (PWFM) circuit adapted to pull pulses of current through the switch terminal based on a feedback signal received onto the feedback terminal, wherein in a second sub-mode of a constant voltage (CV) mode the PWFM circuit modulates a pulse frequency of said pulses of current, wherein a human auditory range has an upper limit, and wherein in a first sub-mode of the CV mode the PWFM circuit modulates the pulse width of said pulses but maintains the pulse frequency at less than thirty kilohertz but above the upper limit of the human auditory range.

8. The flyback switching converter controller integrated circuit of claim 7, wherein the PWFM circuit comprises:
 an oscillator that outputs a periodic signal having a frequency, wherein the frequency of the periodic signal is modulated in said second sub-mode, and wherein the frequency of the periodic signal is fixed in said first sub-mode at a substantially constant value that is at least twenty kilohertz but less than thirty kilohertz; and
 a pulse width modulation circuit that receives the periodic signal from the oscillator and that is coupled to pull said pulses of current through the switch terminal.

9. The flyback switching converter controller integrated circuit of claim 7, wherein the PWFM circuit also has a third sub-mode of the CV mode, wherein in the third sub-mode the PWFM circuit modulates the pulse width of said pulses but maintains the pulse frequency at a substantially constant value, wherein in the second sub-mode the pulse frequency can range from twenty kilohertz to the substantially constant value.

10. The flyback switching converter controller integrated circuit of claim 8, wherein the PWFM circuit further comprises:
 an error circuit that generates an error voltage based on a signal received onto the feedback terminal and a reference voltage, wherein the error voltage is supplied to the oscillator and wherein the error voltage is supplied to the pulse width modulation circuit.

11. A method comprising:
 in a second operating mode, frequency modulating an on-time of a switch such that an output voltage of a flyback switching converter is controlled to be constant, wherein in the second operating mode a switching frequency of the switch can range in a frequency range down to a first frequency but cannot fall below the first frequency; and
 in a first operating mode, pulse width modulating the on-time of the switch such that the output voltage is controlled to be constant, wherein in the first operating mode the switching frequency of the switch is fixed at the first frequency, wherein a human auditory range has an upper limit, and wherein the first frequency is just above the upper limit of the human auditory range.

12. The method of claim 11, further comprising:
 in a third operating mode pulse width modulating the on-time of the switch such that the output voltage is controlled to be constant, wherein in the third operating mode the switching frequency of the switch is fixed at a second frequency, and wherein in the second operating mode the switching frequency can range from the second frequency to the first frequency but cannot exceed the second frequency and cannot fall below twenty kilohertz.

13. The method of claim 12, wherein the flyback switching converter has a constant voltage (CV) mode, and wherein the first, second, and third operating modes are sub-modes of the CV mode.

14. The method of claim 11, further comprising:
 using a feedback signal to determine whether the flyback switching converter will operate in the first operating mode or in the second operating mode, wherein the feedback signal is indicative of the output voltage.

15. A flyback switching converter controller integrated circuit comprising:
 a feedback terminal adapted to receive a feedback signal indicative of an output voltage of a flyback switching converter;
 a switch terminal adapted to communicate a stream of control signal pulses; and
 means for: 1) in a low output power sub-mode of a constant voltage (CV) mode, pulse width modulating the stream of control signal pulses such that the pulse frequency of the stream is maintained near a first frequency, 2) in a mid output power sub-mode of the CV mode, pulse frequency modulating the stream of control signal pulses, and 3) in a high output power sub-mode of the CV mode, pulse width modulating the stream of control signal pulses such that the pulse frequency of the stream of control signal pulses is maintained near at a second frequency, wherein the second frequency is higher than the first frequency, and wherein the first frequency is lower than thirty kilohertz.

16. The flyback switching converter controller integrated circuit of claim 15, wherein the means determines whether the flyback switching converter will operate in the low output power sub-mode, the mid output power sub-mode, or the high output power sub-mode based at least in part on the feedback signal.

17. The flyback switching converter controller integrated circuit of claim 15, wherein the feedback signal is received from an optocoupler.

18. The flyback switching converter controller integrated circuit of claim 15, wherein the feedback signal is received from an auxiliary winding of a transformer.

19. The flyback switching converter controller integrated circuit of claim 1, wherein in the higher output power sub-mode of the CV mode the PWFM circuit simultaneously modulates both the pulse width and the pulse frequency of the stream.

20. The flyback switching converter controller integrated circuit of claim 6, wherein the second frequency does not exceed forty kilohertz.

21. The flyback switching converter controller integrated circuit of claim 7, wherein in the second sub-mode of the constant voltage (CV) mode the PWFM circuit modulates both the pulse frequency and the pulse width of said pulses of current.

22. The method of claim 11, wherein in the second operating mode, the frequency modulating the on-time of the switch and pulse width modulating the on-time of the switch are performed simultaneously.

23. The flyback switching converter controller integrated circuit of claim 15, wherein the means is also for simultaneously pulse width modulating and pulse frequency modulating the stream of control signal pulses in the mid output power sub-mode of the CV mode.

* * * * *